Dec. 21, 1937.    J. J. CUBETE    2,102,615

LIQUID MEASURING DEVICE

Filed Feb. 15, 1937

Inventor:
Joseph J. Cubete
By Dike, Calver and Gray
Attorneys.

Patented Dec. 21, 1937

2,102,615

UNITED STATES PATENT OFFICE 2,102,615

LIQUID MEASURING DEVICE

Joseph J. Cubete, Pittsburg, Kans.

Application February 15, 1937, Serial No. 125,790

7 Claims. (Cl. 73—319)

(Granted under the act of March 3, 1883, as amended April 30, 1928; 370 O. G. 757)

The present invention relates to devices for indicating the quantity of liquid in a tank.

Various devices for this purpose have been proposed. Many of such devices comprise an indicator positioned at the top of the tank and having a small scale over which a pointer is movable by actuation of other mechanism within the tank in response to a change in the liquid level. Such devices, in general, do not supply as accurate an indication as is often desired and, in many instances, are unreliable.

It is an object of the present invention to provide a low cost reliable device which makes possible an accurate visible indication of the liquid content in the tank.

Figure 1:
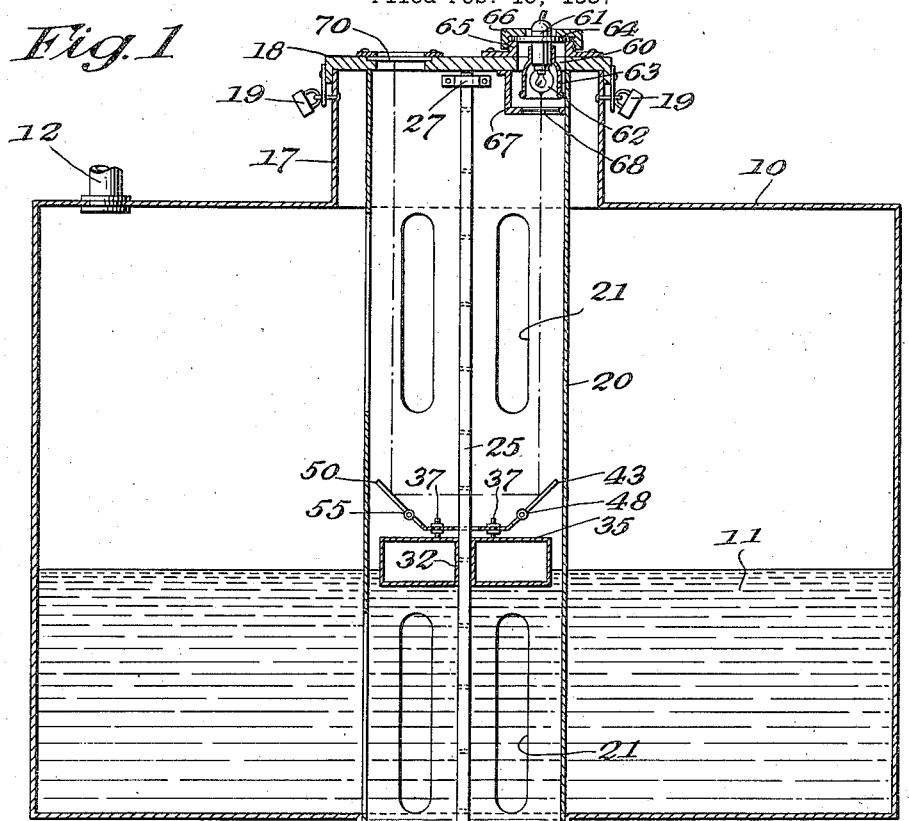
Figure 2:
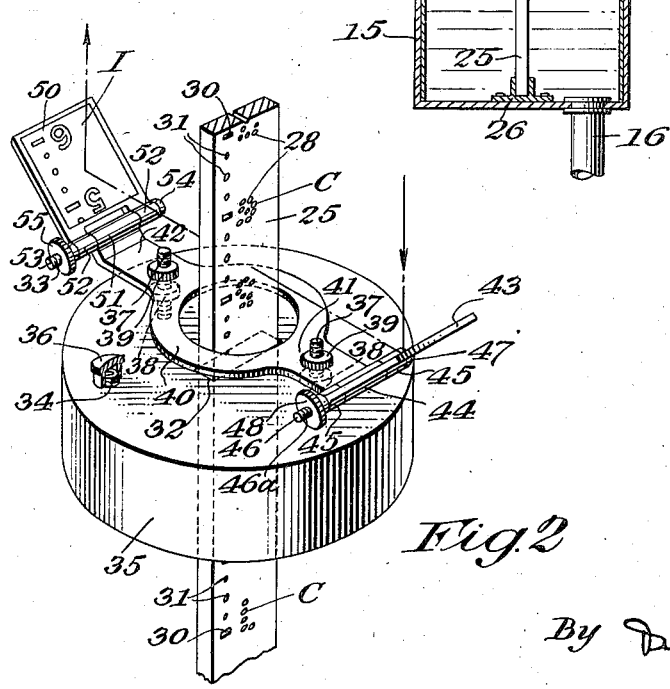
Figure 3:
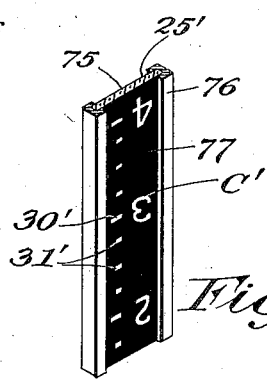

The invention will be more clearly understood from the following description in conjunction with the accompanying drawing: in which, Fig. 1 is a sectional elevational view of a tank containing an indicator embodying the invention;

Fig. 2 is a detail perspective view of a portion of the structure shown in Fig. 1; and Fig. 3 is a detail fragmentary view of a modified form of one of the parts.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the accompanying drawing, there is illustrated a tank 10 adapted to contain a liquid 11. A liquid inlet conduit 12 is suitably connected to the top of the tank. The bottom of the tank may be provided with a cylindrical projection 15 to the bottom of which a liquid discharge conduit 16 is suitably connected. The top of the tank 10 may be provided with a cylindrical projection 17, the diameter of which may be slightly larger than that of the projection 15. An opening providing access to the interior of the tank is provided at the top of the projection 17 and is normally closed by a detachable closure 18 which may be secured in place as by locks 19.

A tube 20 extends from within the projection 17 through the tank into the projection 15 and is provided with a plurality of openings 21 to permit free access of liquid so that the liquid level within the tube 20 must be the same as that within the remainder of the tank 10. A measuring element 25 is positioned to extend vertically within the tube 20 with its lower end in a socket 26 at the bottom of the projection 15 and its top supported by a bracket 27 carried by the tube 20. The measuring element 25 is provided with a plurality of sets of perforations 28, each set forming a character C representative of a quantity of liquid. Each of the characters C is located, preferably inverted, upon the measuring element 25 at a predetermined position to represent the quantity of liquid when the liquid level is at a predetermined lower point on said element. If desired, the measuring element 25 may be provided with a perforation 30 adjacent each of the characters. Between each of the perforations 30 there may be provided other perforations 31 representative of sub-divisions of the unit of measure represented by the characters C.

A hollow float 35 adapted to be carried upon the surface of the liquid 11 is provided with a rectangular passage 32 through which the measuring element 25 passes thereby permitting free vertical movement of the float while preventing turning of the latter. The float 35 is provided with an opening 34 normally closed by a detachable cap 36 whereby materials may be placed within the float to control and adjust its position relative to the liquid level. The float is also provided with threaded studs 37 each carrying a pair of nuts 38 and 39 between which an annular plate 40 is adjustably positioned. The plate 40 is provided with projections 41 and 42 positioned at opposite sides of the measuring element 25.

A deflector 43, such as a mirror, is adjustably hinged to the projection 41. For this purpose, the projection 41 and the deflector 43 are provided with cooperating hinged pintle bearings 44 and 45 respectively, adapted to receive a hinge pintle 46. One end of the hinge pintle 46 is provided with a head 47 adapted to engage the outer edge of one of the bearings 45. The other end of the hinge pintle 46 is provided with a threaded portion 46a carrying a nut 48 adapted to engage the outer edge of the other bearing 45 to hold the deflector at a desired inclination. A slate or screen 50 is adjustably hinged to the projection 42. For this purpose the projection 42 and slate 50 are provided with cooperating hinge pintle bearings 51 and 52 adapted to receive a hinge pintle 53. One end of the hinge pintle 53 is provided with an enlarged head 54 adapted to engage the outer edge of one of the bearings 52 and the other end of the hinge pintle is provided with a threaded portion 33 carrying a nut 55 adapted to engage the outer surface of the other bearing 52, whereby the slate 50 may be positioned at a desired inclination.

The closure 18 is provided with an opening 60 directly above the deflector 43 through which a light source projects. As illustrated, the light source comprises a lamp socket 61 carrying an electric light bulb 62. If desired, the socket 61 may be provided with a reflector 63. The socket 61 is provided with a flange 64 adapted to rest upon the top edge of a threaded collar 65 surrounding the opening 60 and secured to the outer surface of the closure 18. A cap 66 is threaded upon the collar 65 to hold the flange 64 therebetween. A lamp housing 67 having a window 68 is suitably secured to the inner surface of closure 18. A window 70 is provided in the closure 18 directly above the slate or screen 50.

As the level of the liquid in the tank 10 changes the position of the float 35 changes. The deflector 43 and the screen 50 are arranged so as to be at all times opposite at least one of the characters C. The deflector 43 and screen 50 may be brought to this desired position by adjusting the position of the plate 40 with respect to the top of the float 35 by adjusting the two pairs of nuts 38 and 39 on the studs 37. The deflector 43 and screen 50 may be brought to the desired inclination by loosening the nuts 48 and 55, respectively, and after the deflector and screen have been adjusted, again tightening the nuts 48 and 55. The weight of the float may be varied by adding or withdrawing weight through the tank opening 34, thus further assisting in bringing the deflector 43 and screen 50 to the desired position with respect to the element 25. When so adjusted the deflector 43 will project a beam of light from the light source 62 through the adjacent light transmissible characters C to form an image I of the character upon the screen 50. This image I may be easily viewed from the exterior of the tank through the window 70 thus providing a visual indication of the liquid content in the tank.

If desired the measuring element 25 may be modified as shown in Fig. 3. As shown in Fig. 3 the measuring element 25' comprises a plate or a strip of glass 75 which is provided at its longitudinal edges with reenforcements 76. At least one surface of the strip of glass 75 is provided with an opaque coating 77 portions of which are removed to provide light transmissible characters C' and graduations 30' and 31'.

The invention described herein may be manufactured and used by or for the Government of the United States of America for governmental purposes without the payment of any royalties thereon or therefor.

I claim:

1. In a liquid level indicator for tanks, in combination, a measuring element fixed within the tank and extending into the liquid therein, said element having light transmissible portions forming characters each of which is representative of the quantity of liquid in the tank when the liquid level is at a predetermined lower point on said element, a float carried by said liquid, a window in said tank, a source of light, means positioned on said float for projecting a beam of light from said source through the one of said characters corresponding to the liquid level in the tank, and means for causing said beam to form an image of said character which may be viewed through said window.

2. In a liquid level indicator for tanks, in combination, a measuring element fixed within the tank and extending into the liquid therein, said element having light transmissible portions forming characters each of which is representative of the quantity of liquid in the tank when the liquid level is at a predetermined lower point on said element, a float carried by said liquid, a window in said tank, a source of light, means positioned on said float for projecting a beam of light from said source through the one of said characters corresponding to the liquid level in the tank, means for causing said beam to form an image of said character which may be viewed through said window, and means for adjusting said light beam projecting means relative to said element.

3. In a liquid level indicator for tanks, in combination, a measuring element fixed within the tank and extending into the liquid therein, said element having light transmissible portions forming characters each of which is representative of the quantity of liquid in the tank when the liquid level is at a predetermined lower point on said element, a float carried by said liquid, a source of light, a light deflector carried by said float adapted to deflect a light beam from said source through the one of said characters corresponding to the liquid level in the tank, and a screen carried by said float arranged to receive the deflected light beam as an image of said character which may be viewed through said window.

4. In a liquid level indicator for tanks, in combination, a measuring element fixed within the tank and extending into the liquid therein, said element having light transmissible portions forming inverted characters each of which is representative of the quantity of liquid in the tank when the liquid level is at a predetermined lower point on said element, a float carried by said liquid, a window in said tank, a source of light, means positioned on said float for projecting a beam of light from said source through the one of said characters corresponding to the liquid level in the tank, and means for causing said beam to form an image of said character which may be viewed through said window.

5. In a liquid level indicator for tanks, in combination, a measuring element fixed within the tank and extending into the liquid therein, said element having light transmissible portions forming characters each of which is representative of the quantity of liquid in the tank when the liquid level is at a predetermined lower point on said element, a float carried by said liquid, a window in said tank, a source of light, a plate adjustably carried by said float, means carried by said plate for projecting a beam of light from said source through the one of said characters corresponding to the liquid level in the tank, and means carried by said plate for causing said beam to form an image of said character which may be viewed through said window.

6. In a liquid level indicator for tanks, in combination, a measuring element fixed within the tank and extending into the liquid therein, said element having light transmissible portions forming characters each of which is representative of the quantity of liquid in the tank when the liquid level is at a predetermined lower point on said element, a float carried by said liquid, a window in said tank, a source of light, a plate adjustably carried by said float, a light deflector adjustably carried by said plate adapted to deflect a light beam from said source through the one of said characters corresponding to the liquid level in the tank, and a screen adjustably carried by said plate to receive said light beam as an image of said character which may be viewed through said window.

7. In a liquid level indicator for tanks, in combination, a measuring element fixed within the tank and extending into the liquid therein, said element having light transmissible portions forming characters each of which is representative of the quantity of liquid in the tank when the liquid level is at a predetermined lower point on said element, a float carried by said liquid, a window in the top of said tank, a source of light, a light deflector carried by said float in an inclined position so as to deflect a light beam from said source through the one of said characters corresponding to the liquid level in the tank, and a screen carried by said float in an inclined position so as to receive said light beam as an image of said character which may be viewed through said window.

JOSEPH J. CUBETE.